3 Sheets—Sheet 1.

J. WELLS,

Assignor, by Mesne Assignments, to THE UNION PAPER-BAG MACHINE CO.

Paper-Bag Machine.

No. 8,580. Reissued Feb. 11, 1879.

Witnesses,
Geo. H. Graham
J. H. Bolsicka

Joseph Wells,
Inventor;
Assees The Union Paper Bag Machine Co.
by Munson & Philipp
Attys.

3 Sheets—Sheet 2.

J. WELLS,

Assignor, by Mesne Assignments, to THE UNION PAPER-BAG MACHINE CO.

Paper-Bag Machine.

No. 8,580. Reissued Feb. 11, 1879.

Attest,
Geo. H. Graham
J. H. Boleschka

Joseph Wells,
Inventor,
Assee. The Union Paper Bag Machine Co.
by Munson & Philipp
Attys.

3 Sheets—Sheet 3.
J. WELLS,
Assignor, by Mesne Assignments, to THE UNION PAPER-BAG MACHINE CO.
Paper-Bag Machine.
No. 8,580. Reissued Feb. 11, 1879.
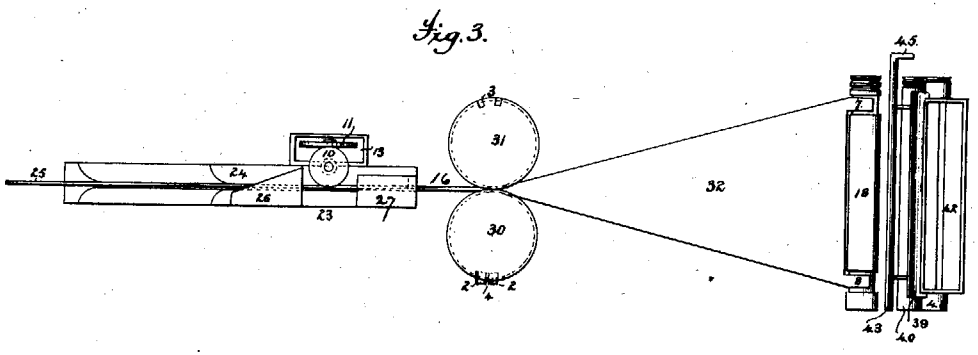
Fig. 3.
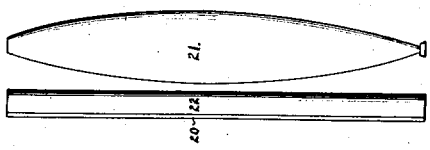
Attest,
J. H. Beleschka
Geo. H. Graham
Joseph Wells,
Inventor,
Assee, The Union Paper Bag Machine Co.
by Munn & Philipp
Attys.

UNITED STATES PATENT OFFICE.

THE UNION PAPER BAG MACHINE COMPANY, OF PHILADELPHIA, PA., ASSIGNEE, BY MESNE ASSIGNMENTS, OF JOSEPH WELLS.

IMPROVEMENT IN PAPER-BAG MACHINES.

Specification forming part of Letters Patent No. 38,253, dated April 21, 1863; Reissue No. 8,580, dated February 11, 1879; application filed December 14, 1878.

*To all whom it may concern:*

Be it known that JOSEPH WELLS of Hoboken, in the county of Hudson and State of New Jersey, did invent a new and useful Paper-Bag Machine, of which the following is declared to be a full, clear, and exact description, reference being had to the accompanying drawings, in which—

Figure 1:
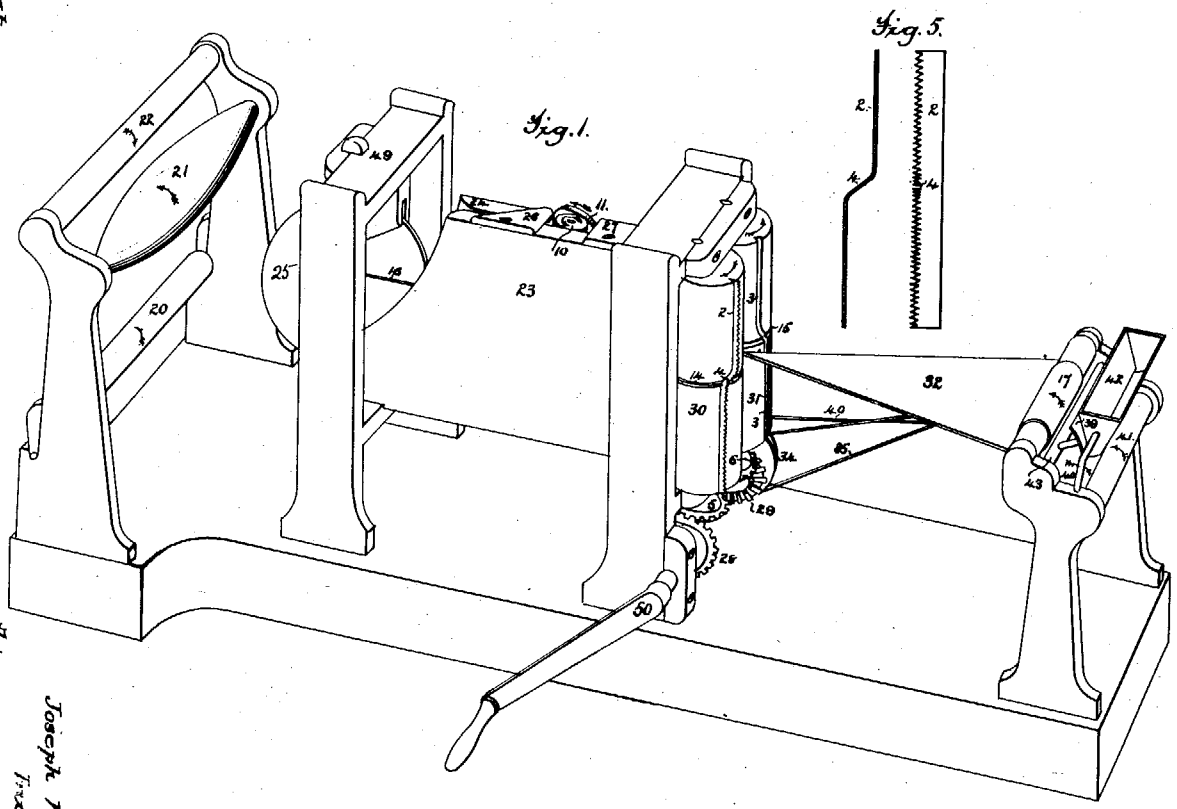
Figure 2:
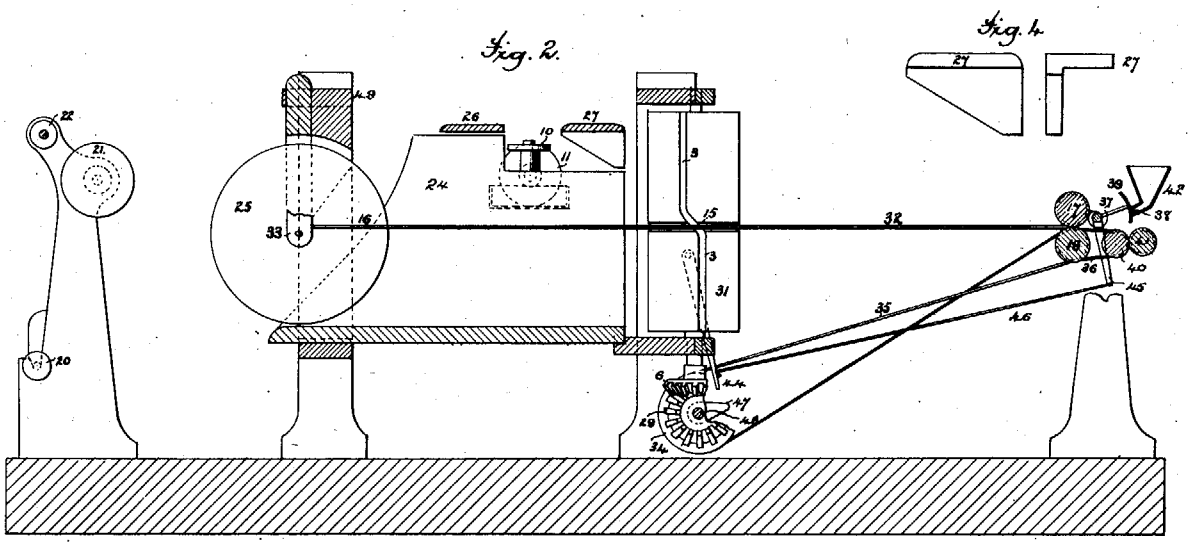

Figure 1 is a perspective view of a machine embodying said invention. Fig. 2 is a longitudinal sectional elevation of the same. Fig. 3 is a plan or top view of the same, the framework being omitted, and the cutting-cylinders being in section. Fig. 4 shows inside and end views, the lap-folder 27 detached. Fig. 5 shows in edge and side views the severing-knife 2 detached.

The construction of the machine is substantially as follows:

A frame is provided of suitable size and form to contain the machinery. In one end of this frame there are placed the supporting-roller 20, that carries a web of paper rolled upon it, the web-spreading roller 21, and the leading-roller 22, with their middle placed at a distance from the central line of the machine equal to one-half of the required width of the lap, and on the side of said line on which is situated the lap-folder 26. The roller 21 is made of an elliptical form.

Situated a convenient distance forward of the rollers 20 21 22, and set up edgewise, are two guide-blocks, 23 24, with the longitudinal central line of the machine passing between them. They are of suitable length, and of any convenient height exceeding the required width of the folded paper, and from their rearward lower ends they are beveled at an angle of forty-five degrees (more or less) nearly to their upper edges, the remaining distance being slightly rounded up. The inside angles of the ends of said guide-blocks are rounded off, and the distance between their respective planes is such that the thin vertically-adjustable folding-disk 25, with a ply of paper on each side of it, will freely move between them. Said folding-disk 25 is of any required diameter, and is situated near the rearward ends of said guide-blocks, it being journaled in a bracket, 33, which depends from a cross-bar, 49, so that its lower edge is adjusted a distance from the inside bottom surface of said guide-blocks to suit the required thickness of the folded paper.

On the upper edge and near the rearward end of the guide-block 23 is fixed one of the lap-folders 26, which is made in the form of a right-angled triangle, with its short line extending directly across the edges of said guide-blocks, thus situating its hypotenuse obliquely across the said edges. Between the plane of said lap-folder and the edge of the guide-block 24 there is sufficient space to allow the lap to pass through. The other lap-folder, 27, is situated in front of the lap-folder 26, and on the guide-block 23 with it, and is constructed substantially the same; but instead of its plane being at right angles with the plane of the guide-block 23, it is parallel with and at a distance from it sufficient to allow the folded lap of paper to pass through. A portion of the guide-block 24 is removed, to allow the lap-folder 27 and the paste-wheels 10 11 to be placed in their proper position. One of said paste-wheels, 10, is placed in a horizontal position, with its edge rolling against the edge of the folded paper onto which the lap is to be folded, and between said lap-folders 26 27. The other paste-wheel, 11, revolves in a paste-vat, 13, with the upper edge of its inside plane working against the edge of the paste-wheel 10.

Directly forward of said guide-blocks there are situated two upright cutting-cylinders, 30 31, whose circumference corresponds with the length of the bag to be formed plus the lap which, folded, forms its bottom, and of any convenient length exceeding that of the width of the folded tube. There is fixed in one of these cutting-cylinders, 30, a severing-knife, 2, having a serrated edge, which extends from the upper end of said cylinder 30 down nearly to its middle, when it turns in a forward direction with respect to the motion of said cylinder, and extends obliquely across said middle the required distance, when it turns again and extends down to the lower end of the said cylinder. The two straight portions of the edge of this knife are so set with respect to each other as to occupy different vertical planes, being thus separated a distance corresponding with the width of lap required for forming the bottom of the bag, and in the middle of this knife there is formed a slot, 4, of sufficient width and depth to clear a rod, 16, that secures a turning-plate, 32, in proper position.

The cutting-cylinder 31 has a cutting-groove, 3, formed in its surface, which groove is adapted to receive the edge of the severing-knife 2. These cutting-cylinders are further provided with circumferential grooves 14 15, formed in their middle portion, to allow the passage of the securing-rod 16, the rear end of which rod is attached to the bracket 33, that supports the folding-disk 25, from which this rod passes between the guide-blocks 23 24; and its forward end, just after passing between the cutting-cylinders 30 31 in the grooves 14 15 thereof, is joined to the angle or rearmost part of the turning-plate 32.

The turning-plate 32 is of any required length, and its greatest width is slightly less than the width of the folded tube, its thickness being such as is required. It is triangular in its form, and has a portion of its forward end removed, thus leaving a bearing or lip, 7 8, on either side, that rests upon one, 18, of the feeding or drawing rollers 17 18, said rollers being cut away at their ends, as shown.

When in its proper position a transverse line through the plane of this turning-plate will be at right angles to the axes of the cutting-cylinders 30 31.

Situated above the feeding or drawing roller 18, and in working contact with it, is a companion feeding or drawing roller, 17. The diameters of said feeding or drawing rollers are reduced where the bearings or lips 7 8 of the turning-plate 32 pass between them sufficiently to prevent their impinging upon said bearings or lips, the structure being such that a tube supported upon said turning-plate may be nipped by said rollers, and be thereby fed onward. Said feeding or drawing rollers are operated by the pulley 34 and bell 35.

At a convenient distance in advance of the feeding or drawing roller 18, and on a horizontal line with it, are journaled two folding-rollers, 40 41, suitably geared together, and operated in unison by a belt, 36, receiving motion from the roller 18.

Situated above these folding-rollers 40 41 is a paste-box, 42, the bottom of which has an open mouth, 38, of any convenient length exceeding the width of the paper tube, and working against said mouth 38 is a curved vibrating pasting-plate, 39, whose length is sufficient to cover said slot. The width and curved form of this plate is such that during its vibrations over said mouth the same is always closed, and yet admits the passage of a sufficient amount of paste to properly coat the exterior face of the said plate. This pasting-plate is attached by arms to a rock-shaft, 43, that is operated by the lever 44, rock-arm 45, connecting-rod 46, and the tappet 47, attached to one end of the driving-shaft 48.

When not undergoing vibration, said pasting-plate is held with its lower edge nearly up to the lower edge of the mouth 38 by the spring 37, and the parts are so arranged that in its downward movement the lower edge of said pasting-plate 39 passes between the folding-rollers 40 41, thus acting as a folding-blade, operating to double the bottom lap into the nip of said rollers.

The cutting-cylinders are rotated by miter-wheels 5 6, attached to the lower ends of their respective shafts, which mesh with similar wheels 28 29, fast on the shaft 48, which is provided with a crank, 50.

The operation of the machine is as follows: The paste-vat 13 and box 42 are supplied with paste, and a web of paper of the required width in the form of a roll is placed on the roller 20. The end of the paper web is passed over the leading-roller 22 and under the spreading-roller 21, which, being elliptical in its form, preserves the bearing across the paper while it is being folded or doubled transversely. The end of the paper web thence passes under the adjustable folding-disk 25, which holds it down the required distance from the upper edges of the guide-blocks 23 24, while its two sides are upturned or folded by said guide-blocks as said sides pass between them.

The middle of the roll of paper having been placed on one side of the central line of the machine, it follows that one of the edges of the web will now be even with the upper edge of the guide-block 24, while its other edge will project above the upper edge of the guide-block 23 a distance sufficient for forming the longitudinal lap, which edge, coming into contact with the lap-folder 26, will be turned by it at right angles and across the edge of the guide-block 24, while the other edge will pass between the guide-block 23 and the edge of the paste-wheel 10, causing said wheel and the wheel 11 to revolve, and thus causing paste to be received from the latter, and to be applied by the former to said edge of the web. As this turned edge of the web passes through the lap-folder 27, it is further turned over, so as to embrace the other or pasted edge of the web, thereby uniting the said edges of the web by a pasted longitudinal seam, and forming a tube, which pasted seam is pressed flat as the tube passes through the cutting-cylinders 30 31.

The cutting-cylinders are put in motion by turning the crank 50 in the direction indicated by the arrow, thereby drawing the paper web between them, whereby the above-described operations of folding and pasting and seam-forming, to convert the paper web into a tube, will be continued till the roll of paper is exhausted.

At each revolution of said cutting-cylinders the severing-knife 2 cuts through the paper tube transversely, with the exception of the space left by the slot 4 in the edge of said knife, and the lower half of the tube as cut by said severing-knife will extend beyond the upper half sufficiently to form the bottom lap of the bag. The tube now passes onto the turning-plate 32, which, while supporting it, distends or turns the tube laterally, so that its central parts are changed to form its edges, and vice versa, thus bringing the bottom lap into its proper position to be folded to complete the bag-bottom when said lap passes to the bottom-closing mechanism.

The laterally distended or spread tube now passes between the feeding or drawing rollers 17 18, by which it is drawn forward to the bottom closing or finishing mechanism, the said uncut spaces uniting successive bag-lengths, serving to hold it together and enable it to be carried forward. When said feeding or drawing rollers have moved the tube the required distance beyond the vertical line of contact of the folding-rollers 40 41, the tappet 47 will operate the curved pasting-plate 39, causing its lower edge to descend upon the bottom lap, and to force it between and into the nip of said folding-rollers, at the same time causing said lap, as it turns upward, to come into contact with the surface of paste on said pasting-blade and to receive paste therefrom. When the tappet 47 ceases its action the pasting and folding blade 39 is quickly raised to its upper position by the action of the spring 37, while the bottom lap, seized by the folding-rollers, is folded onto the body of the tube, which, passing through the folding-rollers 40 41, completes the formation of the bag-bottom.

As the said folding-rollers are operated by the belt 36, which passes over an enlarged pulley on the end of one of the feeding or drawing rollers, and thus are revolved more rapidly than said feeding-rollers, it follows that a tension is created upon the bag-tube which severs the said uncut spaces or connecting-link between the forward bag and the succeeding bag-length, by which operation the bag is completed and is fed out of the machine, while the bottom lap of the next succeeding bag-length is fed over the said folding-rollers, to be in like manner manipulated.

The tension of the belt 36 is so regulated that it slips when one bag-length is being acted upon at the same time by both the feeding-rollers 17 18 and the folding-rollers 40 41.

What is claimed is—

1. The method of forming paper bags, the same consisting in, first, partially severing a tube by transverse cuts, whereby the extent of a bag-length is defined, free edges adapted to be disposed to constitute the bottom of a bag are obtained, and an uncut portion of the tube remains, which connects successive bag-lengths together; second, spreading and flattening said tube, so as to properly dispose the free edges that are to constitute its bottom; third, pasting and folding said bottom; and, fourth, severing the uncut portion of the tube, all substantially as described.

2. In a bag-machine provided with mechanisms for pasting and folding a severed tube, so as to close its open end and form the bottom of a bag, the combination therewith of a cutting mechanism adapted to but partially sever said tube, and thus provide it with an uncut portion, whereby such successive partially-detached bag-lengths of the tube may be drawn from one mechanism to another until the forward bag is completed, all substantially as described.

3. The combination of a mechanism for forming a web into a tube, a cutting mechanism partially severing said tube transversely, and providing free edges adapted to form the bottom of a bag, mechanism for folding said bottom, and mechanism for severing the uncut portion of the tube and detaching the forward bag-length from the succeeding one, all substantially as described.

4. The combination of a cutting mechanism partially severing a tube transversely, and providing it with an uncut portion connecting successive bag-lengths of the tube, and free edges adapted to form a bag-bottom, mechanism for spreading and flattening said free edges, and disposing the parts of the bag-bottom for subsequent manipulation, a pasting mechanism, and a folding mechanism for completing the said bag-bottom, and a mechanism for severing said uncut portion of the tube, all substantially as described.

5. The combination of the following instrumentalities: a mechanism partially severing a tube transversely, and providing it with uncut portions connecting successive bag-lengths, and free edges adapted to form a bag-bottom, a mechanism for spreading and flattening said free edges and disposing the parts of the bag-bottom for subsequent manipulation, a pasting mechanism and folding mechanism for completing said bag bottom, mechanism for drawing or feeding said partially-severed tube through the machine, and mechanism for severing said uncut portions of the tube and detaching a finished bag from the succeeding bag-length, all substantially as described.

6. The guide-blocks 23 24, constructed and arranged in respect to each other substantially as described.

7. The combination, with the guide-blocks 23 24, of the folding-disk 25, substantially as described.

8. The combination, with the guide-blocks 23 24, of the lap-folders 26 27, substantially as described.

9. The turning-plate 32 and its securing-rod 16, arranged and operating substantially as described.

10. The combination of the turning-plate 32, cutting-cylinders 30 31, and feeding or drawing rollers 17 18, substantially as described.

11. The combination of the pasting-plate 39 with the paste-box 42, provided with a mouth, 38, substantially as described.

12. The combination, with the folding-disk 25, of the elliptical roller 21, substantially as described.

In witness whereof THE UNION PAPER BAG MACHINE COMPANY, by EDWIN J. HOWLETT, president, have hereunto set their hand.

THE UNION PAPER BAG MACHINE COMPANY,
By EDWIN J. HOWLETT, *President.* [L. S.]

Witnesses:
H. T. MUNSON,
GEO. H. GRAHAM.